United States Patent
Song (10) Patent No.: US 7,509,104 B2
(45) Date of Patent: Mar. 24, 2009

(54) METHOD AND APPARATUS FOR TUNING RADIO FREQUENCY

(75) Inventor: Seung-Hyun Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 11/181,315

(22) Filed: Jul. 14, 2005

(65) Prior Publication Data
US 2006/0019623 A1 Jan. 26, 2006

(30) Foreign Application Priority Data
Jul. 20, 2004 (KR) .................. 10-2004-0056237

(51) Int. Cl.
*H04B 1/18* (2006.01)
(52) U.S. Cl. .............. 455/190.1; 455/131; 455/147; 455/192.1; 455/334; 455/315; 348/731; 348/725; 348/726; 327/116; 327/119; 327/124; 375/344
(58) Field of Classification Search ......... 455/190.1, 455/189.1, 227, 313–316, 323, 209, 260, 455/324, 550.1, 552.1, 553.1, 133, 140–147, 455/179.1–197.1, 311–319, 118, 131, 334; 348/725, 726, 731; 327/116, 119, 124; 375/298, 375/300, 302, 320, 322, 344
See application file for complete search history.

(56) References Cited

U.S. PATENT DOCUMENTS

| 4,352,209 | A | * | 9/1982 | Ma | 455/315 |
| 4,562,472 | A | * | 12/1985 | Carlson | 348/737 |
| 5,737,035 | A | * | 4/1998 | Rotzoll | 348/725 |
| 5,847,612 | A | * | 12/1998 | Birleson | 331/2 |
| 6,127,962 | A | * | 10/2000 | Martinson | 342/20 |
| 6,999,747 | B2 | * | 2/2006 | Su | 455/324 |
| 7,072,633 | B2 | * | 7/2006 | Gomez et al. | 455/260 |
| 7,098,967 | B2 | * | 8/2006 | Kanno et al. | 348/726 |
| 7,180,553 | B2 | * | 2/2007 | Su | 348/731 |
| 7,262,815 | B2 | * | 8/2007 | Su | 348/731 |
| 7,266,352 | B2 | * | 9/2007 | Soe et al. | 455/209 |
| 2005/0001937 | A1 | * | 1/2005 | Lee et al. | 348/731 |
| 2005/0266806 | A1 | * | 12/2005 | Soe et al. | 455/88 |

OTHER PUBLICATIONS

Korean Patent Application No. 1020010063604 to Choi et al, having Publication date of Apr. 23, 2003 (w/ English Abstract page).
Korean Patent Application No. 1020020041610 to Sawyer, having Publication date of Jan. 29, 2003 (w/ English Abstract page).
Japanese Patent Application No. 09-166827 to Michihiro et al., having Publication date of Jan. 22, 1999 (w English Abstract page).

(Continued)

*Primary Examiner*—Edward Urban
*Assistant Examiner*—Junpeng Chen
(74) *Attorney, Agent, or Firm*—Monica H. Choi (57) ABSTRACT

A double conversion RF tuner includes an up-conversion unit and a down-conversion unit. The up-conversion unit up converts a received radio frequency (RF) signal corresponding to a first frequency band to a first intermediate frequency (IF) signal and up-converts the received RF signal corresponding to a second frequency band higher than the first frequency band to a second IF frequency. The down conversion unit down converts one of the first and second IF signals outputted from the up-conversion unit to a final IF signal.

19 Claims, 5 Drawing Sheets

OTHER PUBLICATIONS

Japanese Patent Application No. 10-088422 to Masaki et al., having Publication date of Oct. 19, 1999 (w/ English Abstract page).

Korean Patent Application No. 1020000061967 to Bang et al, having Publication date of May 2, 2002 (w/ English Abstract page).

* cited by examiner

| | First RF Frequency Band | Second RF Frequency Band |
|---|---|---|
| R302 — RF Frequency Band | 54MHz to 458MHz | 458MHz to 862MHz |
| R304 — Frequency of Local Oscillator Signal ($F_{LO1}$) | $F_{LO1} = (IF1\text{-}1) + RF$ | $F_{LO1} = (IF1\text{-}2) - RF$ |
| R306 — Frequency of IF Signal | IF1-1 = 1220MHz | IF1-1 = 2136MHz |
| R308 — Frequency Range of Local Oscillator Signal ($F_{LO1}$) | Increase from 1274MHz to 1678MHz with increase of RF frequency. | Decrease from 1678MHz to 1274MHz with increase of RF frequency. |
| R310 — Resulting IF frequency | IF1-1 = $F_{LO1}$ - RF Down conversion result @ mixer 24. | IF1-2 = $F_{LO1}$ + RF Up conversion result @ mixer 24. |
| R312 — BPF Activity | BPF 230 filters out $F_{LO1}$ + RF | BPF 240 filters out $F_{LO1}$ - RF |

FIG. 6

METHOD AND APPARATUS FOR TUNING RADIO FREQUENCY

BACKGROUND OF THE INVENTION

This application claims priority under 35 USC § 119 to Korean Patent Application No. 2004-56237, filed on Jul. 20, 2004, the contents of which are herein incorporated by reference in their entirety for all purposes.

1. Field of the Invention

The present invention relates generally to tuning radio frequency signals, and more particularly to a double conversion RF tuner with reduced bandwidth for a local oscillator.

2. Description of the Related Art

A tuner generally amplifies a radio frequency (RF) signal received by an antenna and converts the received RF signal into a desired intermediate frequency (IF) signal. Tuners are used in a wide variety of applications such as televisions, cellular telephones, cable modems, etc. For example, cable boxes are equipped with a tuner to select from numerous cable channels that are received in a frequency band extending from about 54 MHz and to about 862 MHz.

The receiving schemes of the related art may be largely classified into a homodyne scheme and a heterodyne scheme. The homodyne scheme is referred to as "direct conversion" and directly converts the RF signal into a baseband signal. Thus, the term "direct conversion" indicates that an RF frequency is directly converted into a baseband frequency without the conversion into an intermediate frequency (IF). In contrast, the heterodyne scheme uses the intermediate frequency (IF) signal having a lower frequency than the radio frequency (RF) signal. The heterodyne scheme has advantages that amplification may be easily performed in a reception/transmission system and selectivity and stability may be high.

In the heterodyne scheme, two types of tuners known as 'single conversion' and 'double conversion' tuners are used. In the single conversion tuner, the RF signal corresponding to a selected channel is converted to the IF signal. The double conversion tuner, on the other hand, converts the RF signal corresponding to a selected channel to a first IF signal and then converts the first IF signal into a second IF signal (desired final IF signal). The ability of the double conversion tuner to handle larger amounts of signals has resulted in the widespread use of double conversion tuners.

The double conversion tuner uses a so-called double conversion architecture (or up-down conversion architecture). The double conversion architecture has up and down conversion stages to ultimately down convert an input RF signal to the desired final IF signal. The input RF signal is first up converted to the first intermediate frequency having a higher frequency than the RF signal in the up conversion stage. The first intermediate frequency is then down converted to the desired final IF signal having a lower frequency than the RF signal in the down conversion stage.

Figure 1:
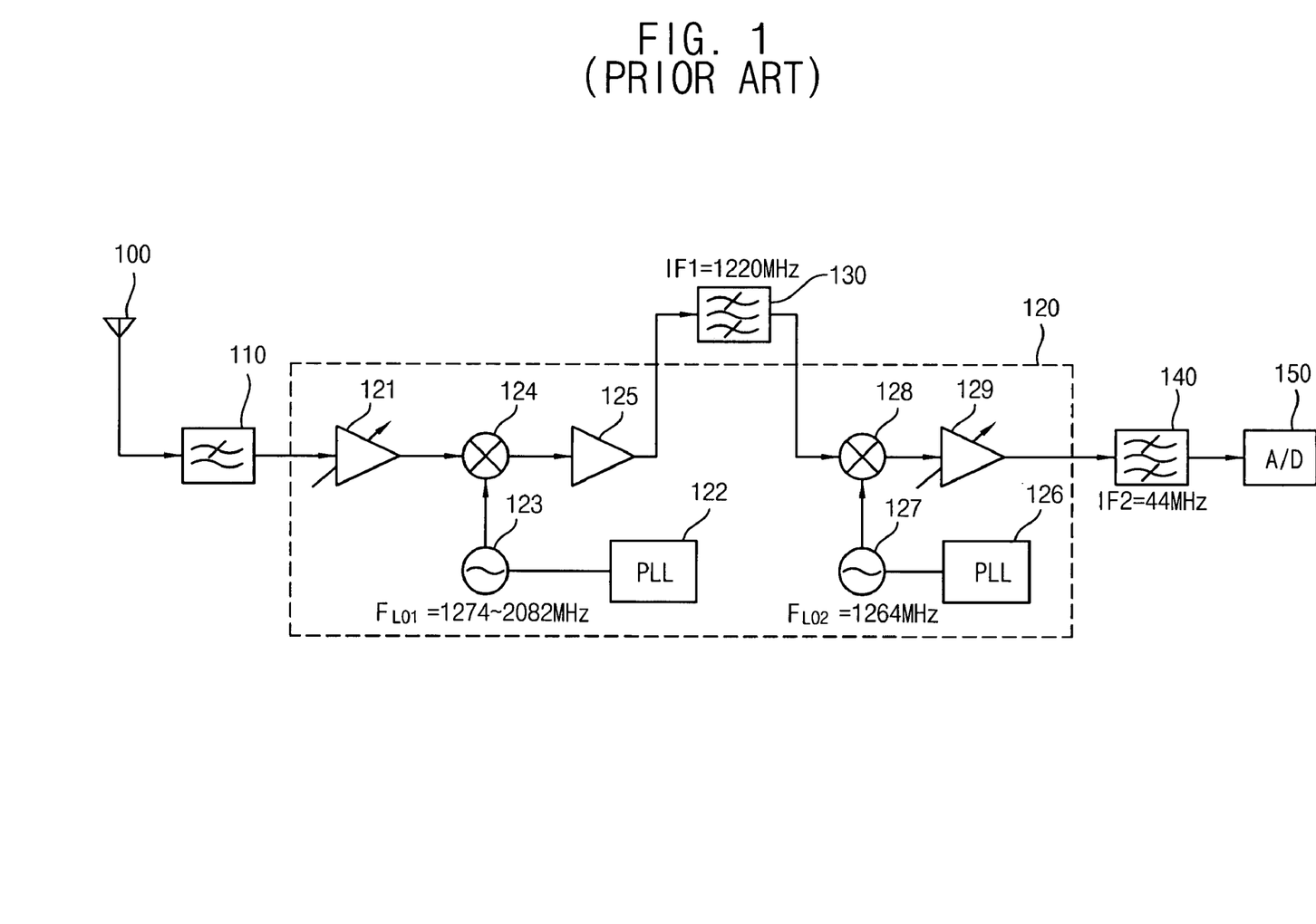
FIG. 1 is a block diagram illustrating a conventional double conversion RF tuner.

However, the double conversion tuner has disadvantages that a frequency tuning bandwidth of a local oscillator (i.e., bandwidth of a local oscillator) is too wide for one voltage controlled oscillator (VCO) to cover numerous channels in the input RF signal. FIG. 1 is a block diagram illustrating a conventional double conversion RF tuner. Referring to FIG. 1, the conventional RF tuner includes an antenna 100, a first filter 110, a tuning section 120, a second filter 130, a third filter 140, and an analog-to-digital converter (A/D) 150.

For example, the input RF signal is to be up converted to the first intermediate frequency IF1 of about 1220 MHz, while the input RF signal is to be ultimately down converted to the second intermediate frequency IF2 of about 44 MHz. When a high-side local oscillator (HSLO) is used, a local oscillator frequency FLO1 provided from a local oscillator 123 of the tuning section 120 has a frequency range of from about 1274 MHz to about 2082 MHz (to select a down conversion result of a mixer 124) so that the input RF signal may be up converted to the first intermediate frequency IF1.

Additionally, using the high-side local oscillator (HSLO), a local oscillator frequency FLO2 provided from a local oscillator 127 of the tuning section 120 has a frequency of about 1264 MHz (to select a down conversion result of a mixer 128) so that the first intermediate frequency IF1 may be down converted to the second intermediate frequency IF2. (Herein, the local oscillator frequencies FLO1 and FLO2 may vary depending on whether an up conversion result or a down conversion result of the mixer is chosen by a receiver designer).

Thus, the frequency range (or frequency bandwidth) of the local oscillator 123 is too wide for one voltage controlled oscillator (VCO) so that two or more VCOs are needed for the conventional double conversion RF tuner.

SUMMARY OF THE INVENTION

Accordingly, the present invention uses two intermediate frequency signals for up conversion of the received RF signal in a double conversion tuner to decrease the frequency bandwidth of the local oscillator.

A double conversion RF (radio frequency) tuner of an aspect of the present invention includes an up-conversion unit and a down-conversion unit. The up-conversion unit generates a first IF (intermediate frequency) signal by mixing an RF signal with a first local oscillator signal when the RF signal is within a first frequency band. In addition, the up-conversion unit generates a second IF signal by mixing the RF signal with the first local oscillator signal when the RF signal is within a second frequency band different from the first frequency band. Furthermore, the down-conversion unit generates a third IF signal from the first or second IF signals.

In an embodiment of the present invention, the up-conversion unit includes a first local oscillator for generating the first local oscillator signal with a frequency that varies depending on the frequency of the RF signal. In that case, the first local oscillator generates the first local oscillator signal with increasing frequency as the frequency of the RF signal in the first frequency band is increased, and with decreasing frequency as the frequency of the RF signal in the second frequency band is increased.

In a further embodiment of the present invention, the double conversion RF tuner also includes a first band-pass filter for filtering the first IF signal before being transmitted to the down-conversion unit, and a second band-pass filter for filtering the second IF signal before being transmitted to the down-conversion unit.

In an example embodiment of the present invention, the first IF signal has a frequency of about 1220 MHz (mega-hertz), the second IF signal has a frequency of about 2136 MHz (mega-hertz), and the third IF signal has a frequency of about 44 MHz (mega-hertz).

In another embodiment of the present invention, the up-conversion unit generates the first IF signal by up converting a negative frequency component of the RF signal with the first local oscillator signal when the RF signal is in the first frequency band, and generates the second IF signal by up converting a positive frequency component of the RF signal with the first local oscillator signal when the RF signal is in the second frequency band.

In a further embodiment of the present invention, the first IF signal has a frequency that is a difference between the frequencies of the RF signal and the local oscillator signal, and the second IF signal has a frequency that is a sum of the frequencies of the RF signal and the local oscillator signal.

In an example embodiment of the present invention, the first frequency band is lower than the second frequency band. For example, the first frequency band has a range of from about 54 MHz (mega-hertz) to about 458 MHz (mega-hertz), and the second frequency band has a range of from about 458 MHz (mega-hertz) to about 862 MHz (mega-hertz).

In this manner, the frequency range of the local oscillator signal in the present invention is one half of the frequency range of the RF signal. Thus, the double conversion tuner of the present invention is implemented with a VCO that has low frequency bandwidth.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, and 6 refer to elements having similar structure and/or function.

DETAILED DESCRIPTION OF THE INVENTION

Figure 2:
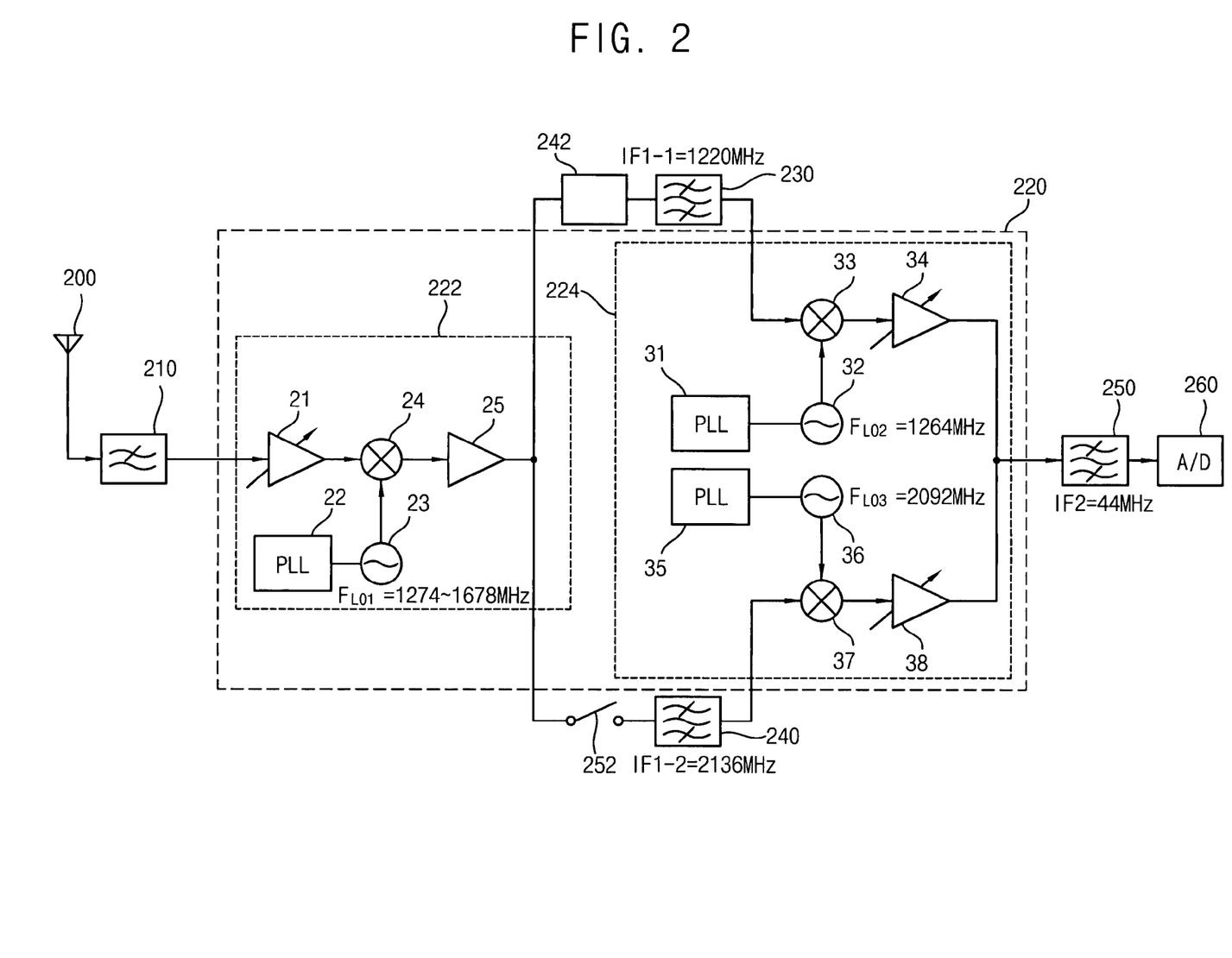
FIG. 2 is a block diagram illustrating a double conversion RF tuner, according to an example embodiment of the present invention.

FIG. 2 is a block diagram of a double conversion RF tuner, according to an example embodiment of the present invention. Referring to FIG. 2, the RF tuner includes a tuning section 220, a first band pass filter 230, and a second band pass filter 240.

A radio frequency (RF) signal received by an antenna 200 is transmitted to a low pass filter 210, and a filtered RF signal from the low pass filter 210 is transmitted to the tuning section 220. The tuning section 220 includes an up-conversion unit 222 and a down-conversion unit 224. The RF signal outputted from the low pass filter 210 is transmitted to the up-conversion unit 222 of the tuning section 220. The RF signal has a frequency band of from about 54 MHz to about 862 MHz, in one example embodiment of the present invention.

The up-conversion unit 222 generates two possible IF (intermediate frequency) signals by up converting the filtered RF signal to one of the first and second IF signals, IF1-1 and IF1-2, respectively. The first IF signal has a relatively low frequency, and the second IF signal has a relatively high frequency, in one embodiment of the present invention. For example, the first intermediate frequency IF1-1 is about 1220 MHz, and the second intermediate frequency IF1-2 is about 2136 MHz.

The up-conversion unit 222 selects one of the first and second intermediate frequencies IF1-1 and IF1-2 to be generated based on a selected channel band of the received RF signal and up converts the received RF signal to one of the first and second intermediate frequencies IF1-1 and IF1-2, respectively. When the RF signal is within a lower first frequency band, the RF signal is up-converted to the first IF signal IF1-1 having a relatively low frequency. Alternatively, when the RF signal is within a higher second frequency band, the RF signal is up-converted to the second IF signal IF1-2 having a relatively high frequency.

Particularly, the up-conversion unit 222 includes a low noise amplifier (LNA) 21, a phase locked loop (PLL) 22, a voltage controlled oscillator (VCO) 23, a mixer 24, and an amplifier 25. The LNA 21 amplifies the filtered RF signal from the low pass filter 210. The voltage controlled oscillator (VCO) 23 is phase controlled by the PLL 22 to produce a first local oscillator frequency signal FLO1 used for up-converting the RF signal from the LNA 21 to a predetermined intermediate frequency signal (one of the first and second IF signals IF1-1 and IF1-2).

Figure 5:
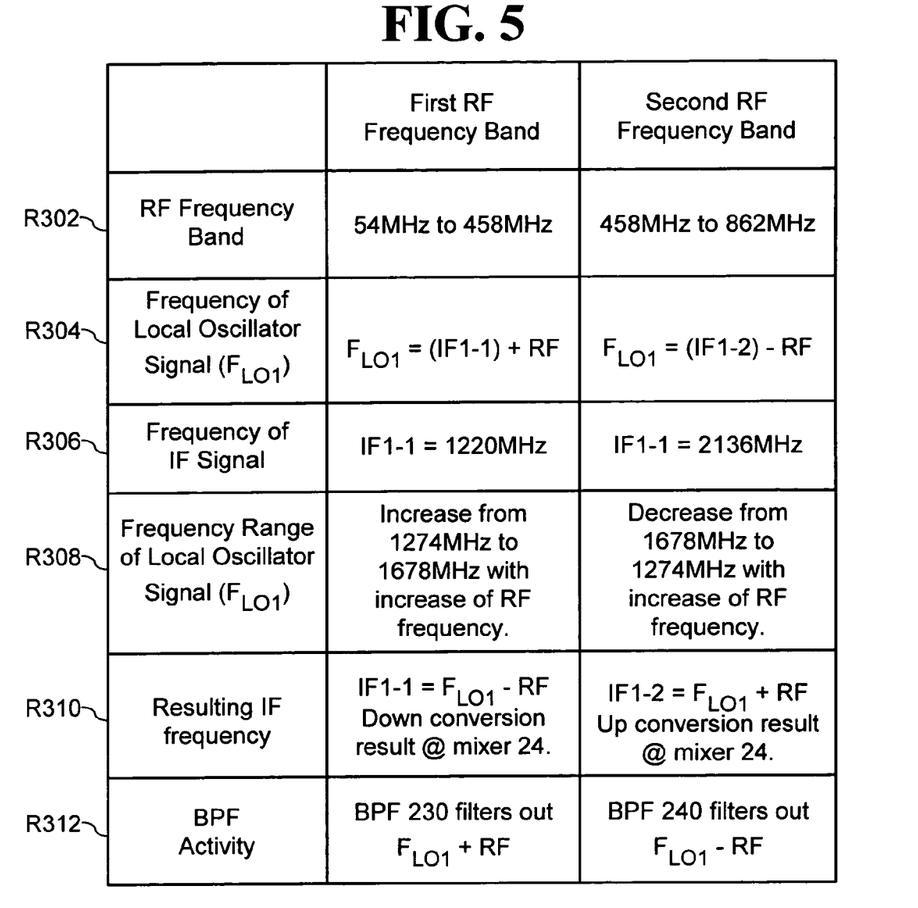
FIG. 5 shows a table of characteristics for double conversion of RF signals in two possible frequency bands, according to an example embodiment of the present invention.

For example, when the selected channel of the received RF signal has a frequency corresponding to a lower first frequency band, for example, from about 54 MHz to about 458 MHz, the VCO 23 generates the first local oscillator frequency FLO1 having a frequency corresponding to a sum of the received radio frequency and the first intermediate frequency IF1-1 (see rows R302 and R304 in Table of FIG. 5). Thus, when the first intermediate frequency IF1-1 is about 1220 MHz, the first local oscillator frequency FLO1 increases from about 1274 MHz to about 1678 MHz as provided from the VCO 23 as the RF frequency is increased from about 54 MHz to about 458 MHz (see rows R306 and R308 in Table of FIG. 5).

In that case, the negative frequency (or image frequency) component of the received RF signal is mixed with the first local oscillator frequency FLO1 by the mixer 24 to produce the first IF signal IF1-1 (i.e., FLO1−RF=IF1-1). Namely, a down conversion result at the mixer 24 is selected. (See rows R308 and R310 of FIG. 5.)

Since an output of the mixer 24 may also include an up converted frequency (i.e., FLO1+RF) as well as the down converted frequency, the first band pass filter 230 is used to filter the output of the mixer 24 to selectively pass the desired down converted frequency (i.e., the first intermediate frequency IF1-1). (See row R312 of FIG. 5.)

Alternatively, when the selected channel of the received RF signal has a frequency corresponding to an upper frequency band, for example, from about 458 MHz to about 862 MHz, the VCO 23 generates the first local oscillator frequency FLO1 corresponding to a difference between the second intermediate frequency IF1-2 and the received radio frequency (see rows R302 and R304 in Table of FIG. 5). Thus, when the second IF signal IF1-2 has a frequency of about 2136 MHz, the first local oscillator frequency FLO1 decreases from about 1678 MHz to about 1274 MHz as provided from the VCO 23 as the RF frequency is increased from about 54 MHz to about 458 MHz (see rows R306 and R308 in Table of FIG. 5).

In that case, the positive frequency component of the received RF signal is mixed with the first local oscillator frequency FLO1 to produce the second IF signal IF 1-2 (i.e., FLO1+RF=IF1-2). Namely, an up conversion result at the mixer 24 is selected. (See rows R308 and R310 of FIG. 5.)

Since the output of the mixer 24 may also include a down converted frequency (i.e., FLO1−RF) as well as the up converted signal, the second band pass filter 240 filters the output of the mixer 24 to selectively pass the desired up converted frequency (i.e., the second intermediate frequency IF1-2). (See row R312 of FIG. 5.)

In this manner, a frequency range (or frequency bandwidth) of the VCO 23 may be reduced. Namely, a bandwidth of the VCO 23 according to an example embodiment of the present invention is about one half of the bandwidth of the conventional RF tuner. In particular, a local oscillator frequency band of the first local oscillator frequency FLO1 (1271 MHz to 1678 MHz) is one half of an RF frequency bandwidth of the RF signal (54 MHz to 862 MHz). In contrast, the frequency bandwidth of the local oscillator in the conventional RF tuner (such as in FIG. 1 for example) is substantially the full frequency bandwidth of the RF signal.

The mixer 24 generates the first IF signal IF1-1 or the second IF signal IF1-2 by mixing the received RF signal and the first local oscillator signal FLO1 from the VCO 23. The amplifier 25 amplifies an output signal of the mixer 24. The first and second band pass filters 230 and 240 filter an output of the up conversion unit 222 (outputted from the amplifier 25) to selectively pass the first and second IF signals, respectively. The filtered first and second IF signals IF1-1 and IF1-2 are provided to the down conversion unit 224.

The down conversion unit 224 down converts the first and second IF signals IF1-1 and IF1-2. The down conversion unit 224 includes VCOs 32 and 36, phase locked loops (PLLs) 31 and 35, mixers 33 and 37, and amplifiers 34 and 38.

The VCO 32 produces a predetermined frequency signal FLO2 to down convert the first IF signal IF1-1 to a third IF (intermediate frequency) signal IF2, with the VCO 32 being phase controlled by the PLL 31. The third IF signal IF2 has a desired intermediate frequency lower than the RF signal and may be further used to down convert the received RF signal to a baseband frequency signal.

For example, the VCO 32 generates a second local oscillator frequency FLO2 of about 1264 MHz so that the first IF signal IF1-1 of about 1220 MHz from the first band pass filter 230 is mixed with the second local oscillator frequency FLO2 by the mixer 33 to produce a down-converted third IF signal IF2 of about 44 MHz. The amplifier 34 is used to amplify an output of the mixer 33.

The VCO 36 produces a predetermined frequency signal FLO3 to down convert the second intermediate frequency IF1-2 to the third IF signal IF2, with the VCO 36 being phase controlled by the PLL 35. For example, the VCO 36 generates a third local oscillator frequency FLO3 of about 2092 MHz so that the second IF signal IF1-2 of about 2136 MHz from the second band pass filter 240 is mixed with the third local oscillator frequency FLO3 by the mixer 37 to produce a down-converted third IF signal IF2 of about 44 MHz. The amplifier 38 is used to amplify an output signal of the mixer 37.

First and second switching elements 242 and 252 may be further included in the RF tuner according to an example embodiment of the present invention to perform on-off (switching) operations to control operations of the first and second band pass filters 230 and 240, respectively. Particularly, when an output signal of the up conversion unit 222 corresponds to the first IF signal IF1-1, the first switching element 242 is turned on so that the output signal of the up conversion unit 222 passes to the first band pass filter 230 whereas, the second switching element 252 is turned off. Alternatively, when the output signal of the up conversion unit 222 corresponds to the second IF signal IF1-2, the second switching element 252 is turned on so that the output signal of the up conversion unit 222 passes to the second band pass filter 240 whereas, the first switching element 242 is turned off.

The first and second band pass filters 230 and 240 filter the output signal of the up conversion unit 222 to output filtered first and second IF signals IF1-1 and IF 1-2. Namely, the first band pass filter 230 filters the output signal of the up conversion unit 222 to pass substantially just the first intermediate frequency IF1-1, and the second band pass filter 240 filters the output signal of the up conversion unit 222 to pass substantially just the second intermediate frequency IF1-2.

An output of the down conversion unit 224 (outputted from one of the first and second amplifiers 34 and 38) is provided to a third band pass filter 250 that selectively passes the third IF signal of about 44 MHz, in one embodiment of the present invention. A filtered output of the third band pass filter 250 is applied to an analog-to-digital (A/D) converter 260 that converts the output of the third band pass filter 250 to a digital signal.

Figure 3:
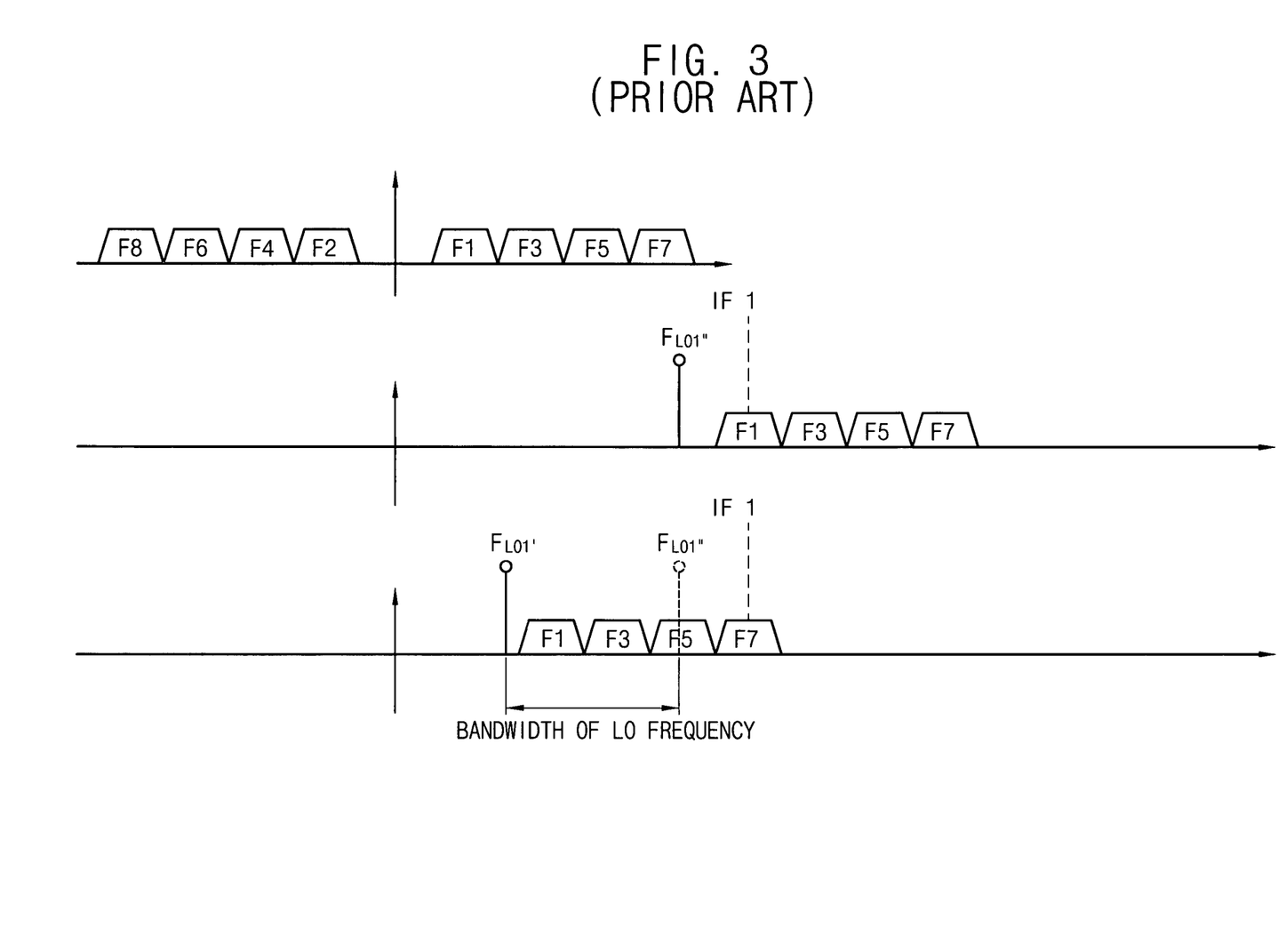
FIG. 3 illustrates frequency shifting in a conventional double conversion RF tuner.
Figure 4:
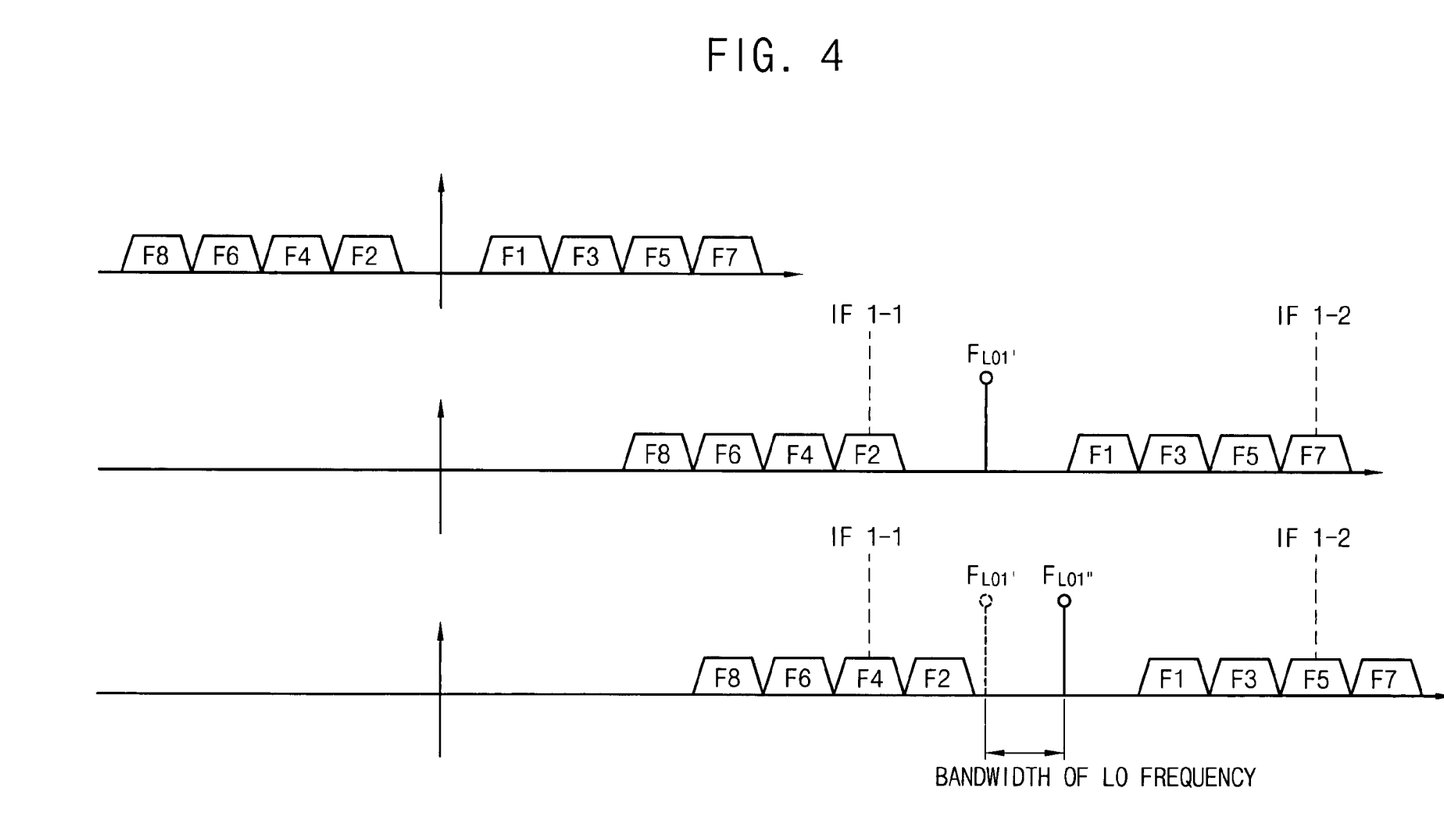
FIG. 4 illustrates frequency shifting in a double conversion RF tuner, according to an example embodiment of the present invention.

FIG. 3 illustrates frequency shifting in a conventional double conversion RF tuner, and FIG. 4 illustrates frequency shifting in a double conversion RF tuner according to an example embodiment of the present invention. In FIG. 3, assume that the received RF signal has one of first, second, third, and fourth positive frequency bands F1, F3, F5 and F7, respectively. In addition, the first, second, third, and fourth positive frequency bands have associated negative image frequency bands F2, F4, F6 and F8, respectively.

For example, the first frequency band F1 has a frequency range from about 54 MHz to about 256 MHz, the second frequency band F2 has a frequency range from about 256 MHz to about 458 MHz, the third frequency band F3 has a frequency range from about 458 MHz to about 660 MHz, and the fourth frequency band F4 has a frequency range from about 660 MHz to about 862 MHz. However, any frequency band of the received RF signal described herein is for illustrative purposes only and is not meant to imply a required bandwidth.

Referring to FIG. 3, before down converting the received RF signal to a desired intermediate frequency, the received RF signal is up converted to a predetermined intermediate frequency IF1 higher than the RF signal in the conventional double conversion RF tuner. For example, the intermediate frequency IF1 has a frequency of about 1220 MHz. The frequency bandwidth of the local oscillator (or frequency tuning bandwidth) has a range from a first local oscillator frequency FLO1' for up conversion of the RF signal having a high frequency to a second local oscillator frequency FLO1" for up conversion of the RF signal having a low frequency.

For example, with high-side injection for up converting the RF signal, when the RF signal has the low frequency of about 54 MHz in the lower band F1, the second local oscillator frequency FLO1" of about 1166 MHz is generated by the local oscillator so that the intermediate frequency IF1 of about 1220 MHz is generated. Alternatively, with low-side injection for up converting the RF signal, when the RF signal has the high frequency of about 862 MHz in the upper band F7, the first local oscillator frequency FLO1' of about 358 MHz is generated by the local oscillator so that the intermediate frequency IF1 of about 1220 MHz is generated.

Thus, as illustrated in FIG. 3 for the conventional RF tuner, the frequency tuning bandwidth of the local oscillator is substantially same as the bandwidth of the received RF signal. Therefore, two or more VCOs may be needed in the conventional RF tuner for the wide bandwidth of the local oscillator.

Referring to FIG. 4, the RF tuner according to an example embodiment of the present invention uses two intermediate frequencies, first and second intermediate frequencies IF1-1 and IF1-2, for up conversion of the received RF signal. For example, the first intermediate frequency IF1-1 is about 1220 MHz, and the second intermediate frequency IF1-2 is about 2136 MHz.

In FIG. 4, assume that the received RF signal has one of first, second, third, and fourth positive frequency bands F1, F3, F5 and F7, respectively, and associated negative image frequency bands F2, F4, F6 and F8, respectively, similar to FIG. 3. According to an example embodiment of the present invention, when the RF signal has a frequency within a lower band (for example, F1 or F3), a negative frequency component of the received RF signal in the image frequency band F2 or F4 is up converted to the first intermediate frequency IF1-1.

For example, when the RF signal having a frequency of from about 54 MHz to about 256 MHz in the lower band F1 is to be up converted, the negative frequency component of from about −256 MHz to about −54 MHz in the image frequency band F2 is up-converted to the first intermediate frequency IF1-1. Similarly, when the RF signal having a frequency of from about 256 MHz to about 458MHz in the lower band F3 is to be up converted, the negative frequency component of from about −458 MHz to about −256 MHz in the image frequency band F4 is up-converted to the first intermediate frequency IF1-1.

As an example, a first local oscillator frequency FLO1' of about 1274 MHz is provided from the local oscillator and mixed with the negative frequency component of about −54 MHz in the lower band F1 to produce the first intermediate frequency IF1-1 of about 1220 MHz (i.e., 1274 MHz−54 MHz=1220 MHz). Alternatively, a second local oscillator frequency FLO1'' of about 1678 MHz is provided from the local oscillator and mixed with the negative frequency component of about −458 MHz in the lower band F3 to produce the first intermediate frequency IF1-1 of about 1220 MHz (i.e., 1678 MHz−458 MHz=1220 MHz).

Since the positive frequency component of the RF signal is also mixed with the local oscillator frequency, the up-converted RF signal contains both the desired component (the first intermediate frequency IF1-1) and also an undesired component (e.g., up conversion results such as 1274 MHz+54 MHz, i.e., 1324 MHz or about 1678 MHz+458 MHz, i.e., 2136 MHz, according to high-side injection). Accordingly, the up-converted RF signal is provided to a band pass filter 230 or 240 to remove frequencies outside the first intermediate frequency IF1-1. Namely, the positive frequency component of the RF signal in the frequency band F1 or F3 mixed with the local oscillator frequency is rejected by the band pass filters 230 and 240.

In this manner, the RF signal in the lower frequency band F1 or F3 is up-converted by producing the local oscillator frequency ranging from FLO1' to FLO2'' (i.e., about 1274 MHz to about 1678 MHz). In particular, when the frequency of the RF signal is in a lower channel band, for example, F1 or F3, and increases from about 54 MHz to about 458 MHz, the local oscillator frequency is tuned to increase from FLO1' of about 1274 MHz to FLO1'' of about 1678 MHz.

When the frequency of the received RF signal is in an upper frequency band, F5 and F7 of about 458 MHz-862 MHz, the positive frequency component is up converted to the second intermediate frequency IF1-2. For example, the first local oscillator frequency FLO1' of about 1274 MHz is produced to up convert the positive frequency component of about 862 MHz in the upper band F7 to the second intermediate frequency IF1-2 of about 2136 MHz (1274 MHz+862 MHz=2136 MHz). Alternatively, the second local oscillator frequency FLO1'' of about 1678 MHz is produced to up convert the positive frequency component of about 458 MHz in the upper band F5 to the second intermediate frequency IF1-2 of about 2136 MHz (1678 MHz+458 MHz=2136 MHz).

Since the negative frequency of the RF signal is also mixed with the local oscillator frequencies FLO1' and FLO1'', the up-converted RF signal also contains an undesired frequency component (e.g., down conversion result e.g., 1274 MHz− 862 MHz=412 MHz or about 1678 MHz−458 MHz=1220 MHz). Therefore, the up converted RF signal is transmitted through a band pass filter 230 or 240 to remove frequencies outside the second intermediate frequency IF1-2. Namely, the negative frequency component of the RF signal in the frequency band F5 or F7 mixed with the local oscillator frequency FLO1' or FLO1'' is rejected by the band pass filters 230 and 240.

Accordingly, the RF signal in the upper band F5 or F7 is up-converted to the second intermediate frequency IF1-2 by producing the local oscillator frequency ranging from FLO1' to FLO1'' (about 1678 MHz to about 1274 MHz). Thus, when the frequency of the RF signal in the upper frequency bands, for example, F5 and F7, increases from about 458 MHz to about 862 MHz, the local oscillator frequency is tuned to decrease from about 1678 MHz to about 1274 MHz.

Therefore, a frequency range (frequency tuning bandwidth) of the local oscillator according to the example embodiment of the present invention is about 1274 MHz to about 1678 MHz which is about ½ of the conventional RF tuner. Therefore, the bandwidth of the local oscillator in the double conversion RF tuner of the present invention is reduced such that the number of VCOs used in the RF tuner is advantageously decreased.

Figure 6:
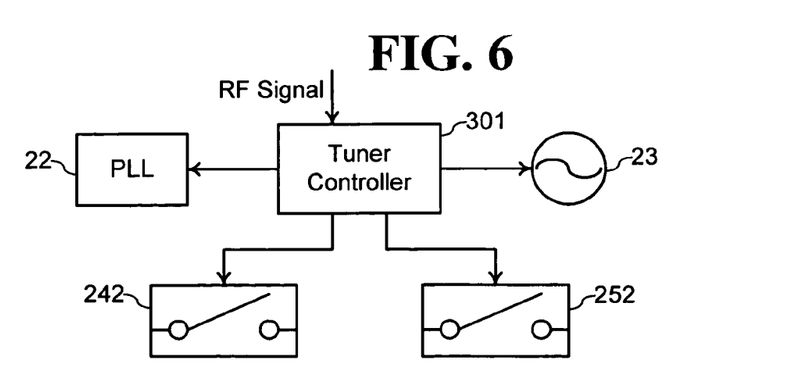
FIG. 6 shows further components for the double conversion RF tuner of FIG. 2, according to an example embodiment of the present invention.

FIG. 6 shows a block diagram of additional component(s) in the double conversion RF tuner of FIG. 2. In FIG. 6, a tuner controller 301 inputs the filtered RF signal from the low pass filter 210. Based on the frequency of such a filtered RF signal, the tuner controller 301 controls the local oscillator 23 and the PLL 22 to generate the local oscillator signal with the desired frequency as described above. Additionally based on the frequency of such a filtered RF signal, the tuner controller 301 controls the switches 242 and 252 to each be turned on or off, as described above.

In this manner, the tuner controller 301 provides automated control of the components of the double conversion tuner of FIG. 2 depending on the frequency of the RF signal. Alternatively, such control of the components of the double conversion tuner of FIG. 2 may be adjusted manually by the receiver designer.

While the present invention has been particularly shown and described with reference to exemplary embodiments thereof, it will be understood by those of ordinary skill in the art that various changes in form and details may be made therein without departing from the spirit and scope of the present invention as defined by the following claims.

For example, any numbers used herein are by way of example only. In addition, note that signal designations such as FL01, RF, IF1-1, and IF1-2 while used to refer to names of signals, are also used herein to refer to a respective frequency of the designated signal since the distinguishing characteristic of each signal herein is the frequency of the signal.

What is claimed is:

1. A method of tuning an RF (radio frequency) signal, comprising:

generating a first IF (intermediate frequency) signal by mixing the RF signal with a first local oscillator signal when the RF signal is within a first frequency band;

generating a second IF signal by mixing the RF signal with the first local oscillator signal when the RF signal is within a second frequency band different from the first frequency band;

varying the frequency of the first local oscillator signal depending on the frequency of the RF signal;

increasing the frequency of the first local oscillator signal with an increase in frequency of the RF signal in the first frequency band; and decreasing the frequency of the first local oscillator signal with an increase in frequency of the RF signal in the second frequency band, wherein each of the first and second IF signals is further mixed with another respective local oscillator signal having a frequency that is not changed even as the frequency of the first local oscillator signal is increased with the frequency of the RF signal and that is not changed even as the frequency of the first local oscillator signal is decreased with the frequency of the RF signal.

2. The method of claim 1, further comprising:

band-pass filtering the first IF signal, and generating a third IF signal by mixing the band-pass filtered first IF signal with a second local oscillator signal having a frequency that is not changed even as the frequency of the first local oscillator signal is increased with the frequency of the RF signal; and band-pass filtering the second IF signal, and generating the third IF signal by mixing the band-pass filtered second IF signal with a third local oscillator signal having a frequency that is not changed even as the frequency of the first local oscillator signal is decreased with the frequency of the RF signal.

3. The method of claim 2, wherein the first IF signal has a frequency of about 1220 MHz (mega-hertz), wherein the second IF signal has a frequency of about 2136 MHz (mega-hertz), and wherein the third IF signal has a frequency of about 44 MHz (mega-hertz).

4. The method of claim 1, further comprising:

generating the first IF signal by up converting a negative frequency component of the RF signal with the first local oscillator signal when the RF signal is in the first frequency band; and generating the second IF signal by up converting a positive frequency component of the RF signal with the first local oscillator signal when the RF signal is in the second frequency band.

5. The method of claim 1, wherein the first frequency band is lower than the second frequency band.

6. The method of claim 5, wherein the first frequency band is in a range of from about 54 MHz (mega-hertz) to about 458 MHz (mega-hertz), and wherein the second frequency band is in a range of from about 458 MHz (mega-hertz) to about 862 MHz (mega-hertz).

7. A method of tuning an RF (radio frequency) signal, comprising:

generating a first IF signal by up converting a negative frequency component of the RF signal with a first local oscillator signal when the RF signal is within a first frequency band; and generating a second IF signal by up converting a positive frequency component of the RF signal with the first local oscillator signal when the RF signal is within a second frequency band;

wherein the first IF signal has a frequency that is corresponding to a difference between the frequencies of the RF signal and the local oscillator signal, and wherein the second IF signal has a frequency that is corresponding to a sum of the frequencies of the RF signal and the local oscillator signal, and wherein each of the first and second IF signals is further mixed with another respective local oscillator signal having a frequency that is not changed even as the frequency of the first local oscillator signal is increased with the frequency of the RF signal and that is not changed even as the frequency of the first local oscillator signal is decreased with the frequency of the RF signal.

8. The method of claim 7, further comprising:

varying the frequency of the first local oscillator signal depending on the frequency of the RF signal.

9. The method of claim 7, further comprising:

band-pass filtering the first IF signal, and generating a third IF signal by mixing the band-pass filtered first IF signal with a second local oscillator signal having a frequency that is not changed even as the frequency of the first local oscillator signal is increased with the frequency of the RF signal; and band-pass filtering the second IF signal, and generating the third IF signal by mixing the band-pass filtered second IF signal with a third local oscillator signal having a frequency that is not changed even as the frequency of the first local oscillator signal is decreased with the frequency of the RF signal.

10. The method of claim 9, wherein the first IF signal has a frequency of about 1220 MHz (mega-hertz), wherein the second IF signal has a frequency of about 2136 MHz (mega-hertz), and wherein the third IF signal has a frequency of about 44 MHz (mega-hertz).

11. The method of claim 7, wherein the first frequency band is lower than the second frequency band.

12. The method of claim 11, wherein the first frequency band is in a range of from about 54 MHz (mega-hertz) to about 458 MHz (mega-hertz), and wherein the second frequency band is in a range of from about 458 MHz (mega-hertz) to about 862 MHz (mega-hertz).

13. An RF (radio frequency) tuner, comprising:

an up-conversion unit adaptable to generate a first IF (intermediate frequency) signal by mixing an RF signal with a first local oscillator signal when the RF signal is within a first frequency band, and adaptable to generate a second IF signal by mixing the RF signal with the first local oscillator signal when the RF signal is within a second frequency band different from the first frequency band; and a down-conversion unit for generating a third IF signal from the first or second IF signal;

wherein the up-conversion unit includes a first local oscillator for generating the first local oscillator signal with a frequency that varies depending on the frequency of the RF signal;

and wherein the first local oscillator generates the first local oscillator signal with increasing frequency as the frequency of the RF signal in the first frequency band is increased, and with decreasing frequency as the frequency of the RF signal in the second frequency band is increased, wherein each of the first and second IF signals is further mixed with another respective local oscillator signal having a frequency that is not changed even as the frequency of the first local oscillator signal is increased with the frequency of the RF signal and that is not changed even as the frequency of the first local oscillator signal is decreased with the frequency of the RF signal.

14. The RF tuner of claim 13, further comprising:
a first band-pass filter for filtering the first IF signal before being transmitted to the down-conversion unit; and
a second band-pass filter for filtering the second IF signal before being transmitted to the down-conversion unit.

15. The RF tuner of claim 13, wherein the first IF signal has a frequency of about 1220 MHz (mega-hertz), wherein the second IF signal has a frequency of about 2136 MHz (mega-hertz), and wherein the third IF signal has a frequency of about 44 MHz (mega-hertz).

16. The RF tuner of claim 13, wherein the up-conversion unit is adaptable to generate the first IF signal by up converting a negative frequency component of the RF signal with the first local oscillator signal when the RF signal is in the first frequency band, and to generate the second IF signal by up converting a positive frequency component of the RF signal with the first local oscillator signal when the RF signal is in the second frequency band.

17. The RF tuner of claim 16, wherein the first IF signal has a frequency that is a difference between the frequencies of the RF signal and the local oscillator signal, and wherein the second IF signal has a frequency that is a sum of the frequencies of the RF signal and the local oscillator signal.

18. The RF tuner of claim 13, wherein the first frequency band is lower than the second frequency band.

19. The RF tuner of claim 18, wherein the first frequency band is in a range of from about 54 MHz (mega-hertz) to about 458 MHz (mega-hertz), and wherein the second frequency band is in a range of from about 458 MHz (mega-hertz) to about 862 MHz (mega-hertz).

* * * * *